United States Patent Office 3,363,421
Patented Jan. 16, 1968

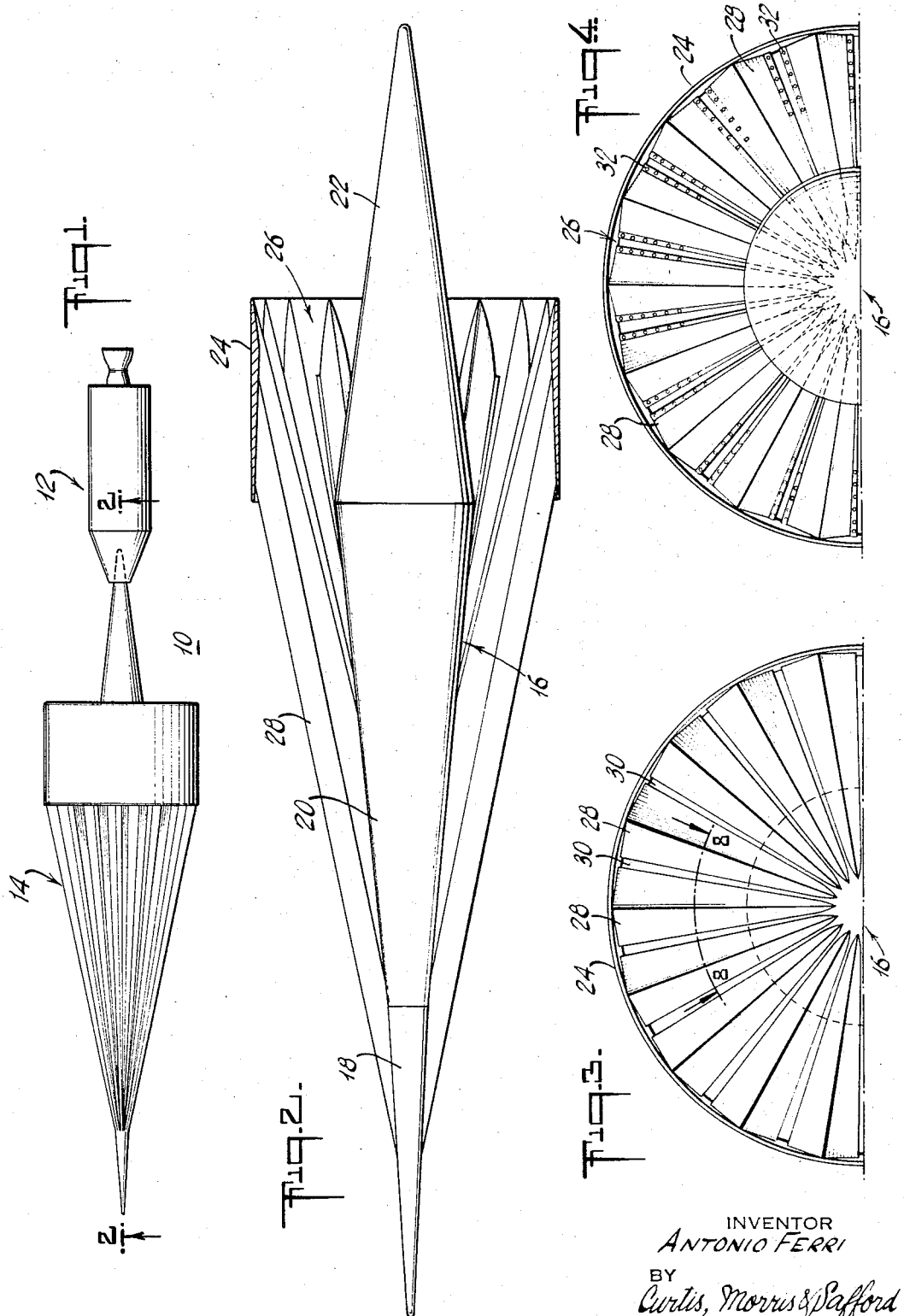

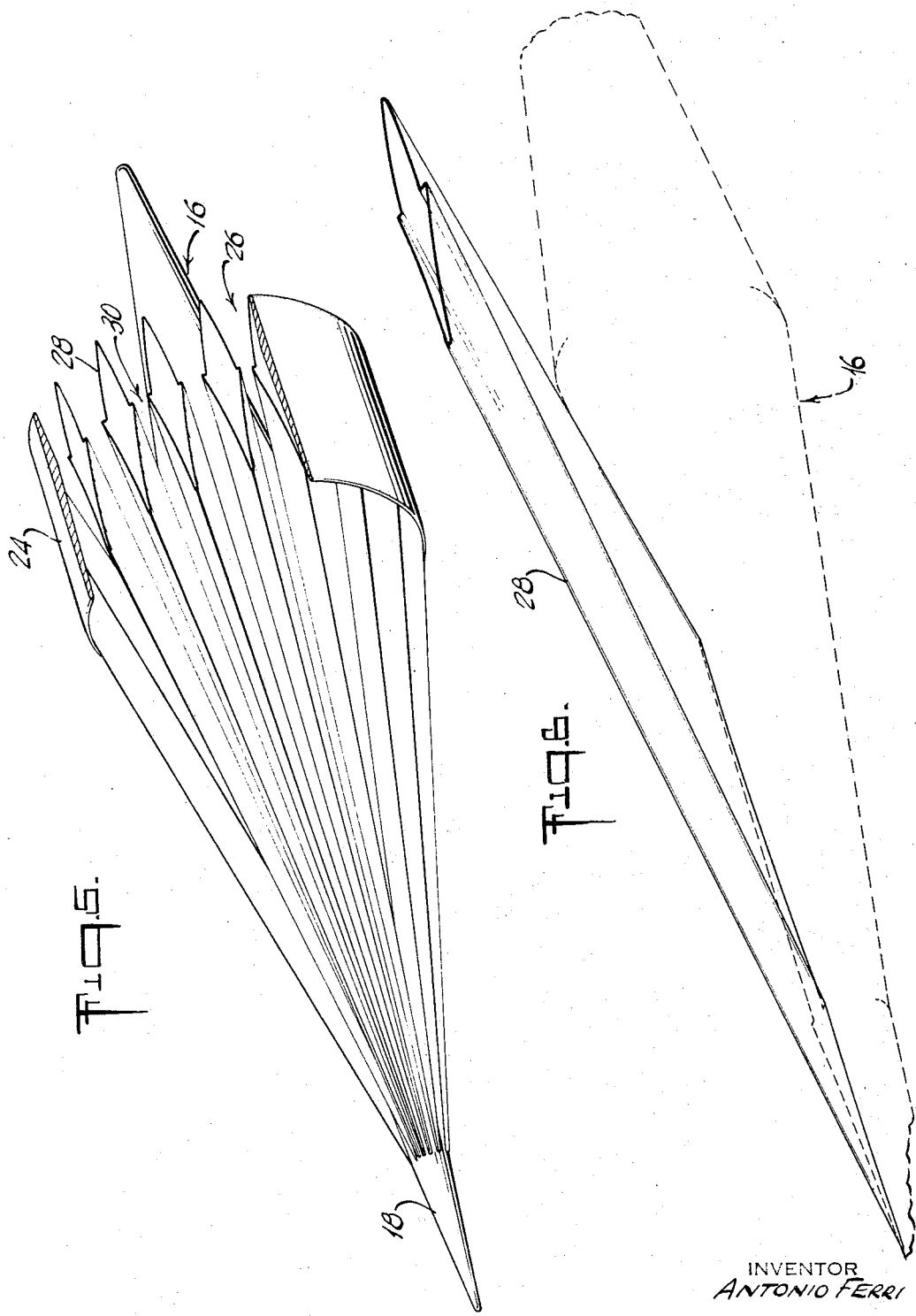

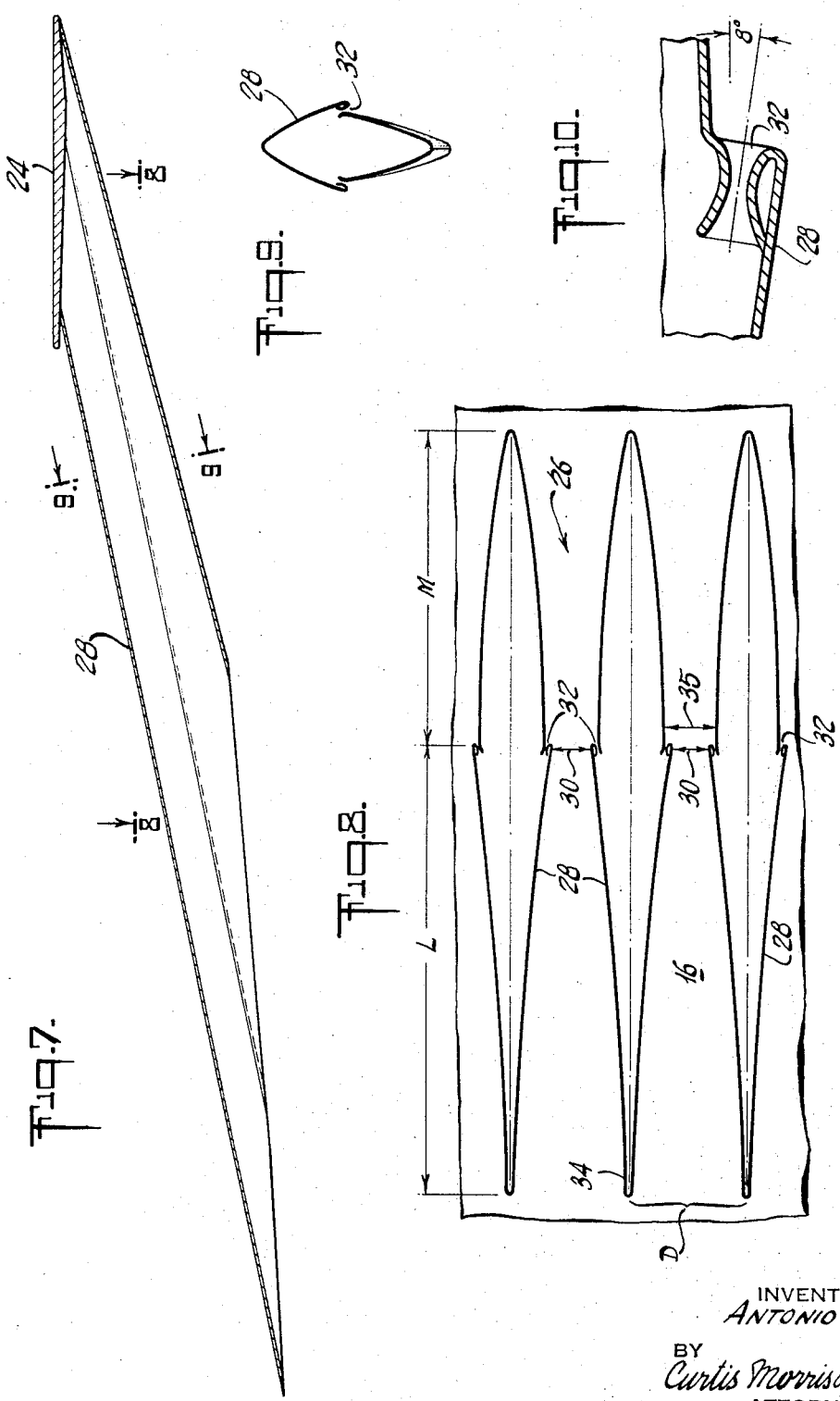

3,363,421
SUPERSONIC ENGINE
Antonio Ferri, Rockville Centre, N.Y., assignor to General Applied Science Laboratories, Inc., Westbury, N.Y.
Filed Jan. 30, 1963, Ser. No. 255,021
5 Claims. (Cl. 60—263)

This invention relates to a ram-jet engine which operates with completely supersonic flow throughout.

An object of this invention is to provide an engine having greatly improved specific impulse and which is suitable for operation at very high supersonic velocity, for example orbital velocity.

A further object is to provide such an engine which has a simple and rugged structure and which can carry a very heavy payload relative to its own weight.

Still another object is to provide a more efficient propulsion arrangement capable of orbiting very heavy payloads.

These and other objects will in part be understood from and in part be pointed out in the following description.

The usual type of ram-jet engine operates by taking in air at low supersonic velocity (e.g. Mach 2), slowing the air down to sub-sonic velocity in the burner region and mixing it with fuel, and then expelling the combusted gases to obtain net forward thrust. Now, one problem with such an engine is that as air speed gets higher and higher, the efficiency of the engine, for a given maximum combustion temperature, rapidly decreases to a point where useful thrust is no longer obtained. For a combustion temperature of 2500° Rankin, which is close to the operating limit of almost all present day metals and engine parts, a speed of the order of Mach 4 is the maximum which previously known ram-jet engines have been able to fly. To reach speeds appreciably higher than this, it therefore has been necessary to use rockets. The present invention provides a ram-jet type of engine designed to operate at speeds from roughly Mach 5 to Mach 25.

Because a rocket engine which burns a chemical fuel must also carry an oxidizer in some form or another, the specific impulse of the rocket is relatively low. This means that for a given total rocket weight, only about 1% can be payload. Thus, a tremendously large and expensive rocket is required to orbit a payload of a ton or so. The new engine provided according to the invention has a specific impulse an order of magnitude greater than that of the best chemical rockets. As will appear, this now makes immediately practical the orbiting of a payload weighing many tons.

In accordance with the invention, in one specific embodiment thereof, the air intake of a ram-jet type of engine is provided with an array of carefully shaped, specially positioned vanes. The air entering the engine flows along and between these vanes, being compressed and slowed down in the process but still at supersonic speeds in the combustion chamber. The amount of compression due to the vanes is such that over a wide range of speeds (e.g. Mach 5 to Mach 25) the air enters the combustion chamber of the engine at a relatively constant static temperature low enough to be withstood by commonly available engine materials.

Fuel is piped through the engine intake vanes, cooling them as it flows, and is injected along their trailing edges into the air streaming between them. This insures optimum mixing of the fuel with the air, which is still supersonic, after combustion and brings about efficient combustion. As a result, full combustion is accomplished within a short distance and the overall engine is relatively short. Because the engine is both compact and simple in structure, a very high thrust to weight ratio is obtained.

In accordance with an aspect of the invention an engine as described above is mounted as the second stage of a vehicle, the first stage of which is a chemical rocket engine. The first stage of the rocket accelerates the second stage to a speed at which it is able to operate, and thereafter the second stage, while still traveling in the atmosphere on a carefully programmed flight, accelerates a payload, such as a third rocket stage, to orbital velocity at the upper edge of the earth's atmosphere. By this means, for a two stage engine with an initial total ground weight of 300,000 lbs., for example, payloads weighing of the order of 10 to 20 tons can be orbited.

A better understanding of the invention together with a fuller appreciation of its advantages will best be gained from the following description given in connection with the accompanying drawings wherein:

FIGURE 1 is a side view of a supersonic engine embodying features of the invention mounted as the second stage of a large, two stage vehicle;

FIGURE 2 is an enlarged side view of the engine, partly in section;

FIGURE 3 is a further enlarged front view of the upper half of the engine seen in FIGURE 2, the lower half being a mirror image;

FIGURE 4 is a view similar to FIGURE 3, but showing the rear of the engine;

FIGURE 5 is a perspective view of the engine with a portion broken away;

FIGURE 6 is an enlarged perspective view of one of the inlet vanes of the engine;

FIGURE 7 is a side section view of the vane;

FIGURE 8 is a section view taken as indicated by lines 8—8 in FIGURE 3, and by lines 8—8 in FIGURE 7;

FIGURE 9 is a cross-section view of a vane taken as indicated by lines 9—9 in FIGURE 7; and FIGURE 10 is an enlarged detail of a fuel orifice along an edge of a vane.

The vehicle 10 shown in FIGURE 1 includes a first stage rocket 12 and a second stage engine 14. The latter, as will be explained shortly, is a ram-jet engine of novel design and includes a payload, which may itself be a rocket. First stage 12 is a rocket of any suitable type known in the art. This rocket serves as a booster for engine 14 to accelerate it to a suitable supersonic velocity within the earth's atmosphere whereupon the engine becomes self-propelling.

As seen in FIGURES 2 and 5, engine 14 includes a central core 16 which has a needle-shaped nose portion 18, a conical central portion 20, and a conical tail portion 22 aligned along a longitudinal axis. Surrounding core 16 is a thin-walled cylinder 24 which together with the core defines an annular combustion chamber 26. Radiating backward and outward from the nose of core 16 to cylinder 24 are a number of closely spaced vanes 28 (see also FIGURE 6). These vanes are specially shaped (see also FIGURES 8 and 9) and serve to slow down and increase the static temperature of the air entering the engine. As seen best in FIGURE 8, each pair of vanes defines a narrow-throat 30 through which the air enters combustion chamber 26. As seen also in the enlarged detail in FIGURE 10, vanes 28 on each side of throats 30 are set back and provided with a lengthwise fuel nozzle 32. Fuel, such as gaseous hydrogen, is sprayed out of nozzles 32 into combustion chamber 26. Now, as seen in FIGURE 8, immediately between the regions where the fuel enters chamber 26, shock waves in the incoming air flow are formed by vanes 28. Thus, combustion of the fuel is immediate and takes place primarily in the central spaces behind throats 30 and away from vanes 28.

Vanes 28 are shaped so that the effective temperature of the air entering through throats 30 into chamber 26 is increased and is in the range from about 2100–3000 R. for an engine air speed over the range from about Mach 5 to 25. These vanes are advantageously thin, hollow members as illustrated and are filled with fuel. In this way heat absorbed by the vanes from the entering air stream is used to heat the fuel; conversely the circulating fuel helps to keep the vanes relatively cool. Core 16, to which the vanes are connected, serves as a central fuel tank from which fuel is pumped to the vanes.

As seen in FIGURE 8, the forward portion of each vane 28 as indicated at 34 is very thin and subtends an angle of about 6°. Behind this portion, the vanes are tapered outward to give isentropic, laminar flow. Just ahead of throat 30, the vane wall is inclined at an angle of about 8° relative to the center-line of the vane. The forward ends of the vanes are separated by a distance D which, for example is about 60 times the width of a throat 8. Just behind throat 30 in FIGURE 8. Just behind throat 30, the lateral distance 35 between the nozzles is about 1.3 times the width of throat 30. The length L of a vane from its forward edge to a nozzle 32 is about 1.5 times the length M from the nozzle to the rear edge of the vane. Length L is of the order of 12 times distance D.

Vanes 28 in conjunction with core 16 and cylinder 24 provide a multiplicity of combustion regions in which fuel from nozzles 32 is efficiently burned. Because of the shock waves produced in the air flow just behind throats 30, the fuel is intimately mixed with the air stream and immediately burned in a very short distance. This means that the engine, for a given length, has very high thrust and efficiency. While not shown, the forward part of core 16 can contain a payload.

One design for an arrangement as shown in FIGURE 1 calls for a total gross take-off weight of 300,000 pounds. The first stage rocket 12 is able to boost engine 14 to a velocity of about Mach 5 while well within the earth's atmosphere. Thereafter, engine 14 breaks away from the first stage and accelerates under its own power to Mach 25. The total thrust of the engine is about 100,000 pounds. It weighs 30,000 pounds and carries 50,000 pounds of fuel (liquid hydrogen), the remainder of the engine gross weight, about 20,000 pounds, is payload. The diameter of the engine is about 25 feet.

The above description is intended in illustration and not in limitation of the invention. Various changes or modifications in the embodiment described may occur to those skilled in the art, and can be made without departing from the spirit or scope of the invention as set forth.

I claim:

1. A ram-jet engine designed to operate with completely supersonic flow throughout and intended for very high supersonic velocity, said engine including walls defining a combustion chamber having a longitudinal axis, air intake means for said chamber, said intake means including a plurality of elongated, upstanding and swept-back vanes arranged like closely spaced spokes radially around axis and which intercept the incoming air stream and set up a plurality of shock-wave foci closely behind the vanes within said chamber, said vanes serving to increase the static temperature and static pressure of the air entering said chamber, and means to supply fuel for burning in said chamber in the vicinity of said foci, each vane in cross-section generally orthogonal to said longitudinal axis being like a double-edge blade, the forward portion of which is wider or thicker at its widest point than the rear portion which it joins along a step or setback, said vanes at said steps defining said supersonic throats, said means to supply fuel to said chamber comprising nozzles along said vane steps.

2. The engine in claim 1 wherein each of said vanes is hollow and is cooled by fuel flowing through them and out of said nozzles.

3. In a ram-jet engine of the character described, means to compress and slow the entering air stream comprising a multiplicity of elongated spoke-like vanes which are somewhat diamond-shaped in cross-section and which are radially outstanding and swept back in front of the air intake of the engine, each pair of vanes defining a long narrow throat which sets up and focuses a shock wave in the air stream behind said throat, the forward walls of each vane meeting in a knife edge, said walls being tapered for isentropic air flow, each vane in cross-section being double-edged, the forward portion of the blade at its thickest being thicker than the rear portion and joining it on each side along a right-angle shoulder.

4. In a ram-jet engine, a long pointed conical center portion having a longitudinal axis, and a plurality of long, somewhat diamond-shaped vanes attached at their forward ends near the front part of said center portion, said vanes being sharply swept back along the length of said center portion and being closely spaced radially therearound, each pair of vanes defining a narrow entering air throat with a shock wave focus just behind said throat, within the confines of the vanes, each vane in a generally cylindrical section parallel to and concentric with said axis having a thin front part which subtends a small angle, each vane along its front part being tapered outward for isentropic laminar flow and having a thick center part, each pair of vanes at their center part defining a respective one of said throats which has a width, the forward edges of a pair of vanes being separated by a distance many times greater than said throat width, the rear part of each vane being tapered to a rear edge, and means to inject fuel forward of each shock wave focus to achieve propulsion of the engine.

5. A ram-jet engine designed to operate with completely supersonic flow throughout and intended for very high supersonic velocity, said engine including walls comprising a long, needle-nosed central cone along a longitudinal axis, an outer cylinder concentric with said cone aft of its forward end and together with it defining an envelope for a combustion chamber, a plurality of elongated, upstanding and swept-back vanes arranged like closely spaced spokes radially around said axis and which intercept the incoming air stream and set up a plurality of shock-wave foci between the vanes, said vanes serving to increase the static temperature and static pressure of the air entering said chamber, said vanes being attached at their forward ends to said cone near its nose and being swept back at an acute angle relative to said cone, the outer rear ends of said vanes being attached to said cylinder, the space between each pair of vanes defining a narrow supersonic throat into said chamber, the walls of said vanes being shaped for isentropic laminar air flow along them, said vanes being somewhat diamond-shaped in a cross-section generally orthogonal to said axis with their widest parts being close to adjacent vanes and defining the throats into said chamber, and means to inject fuel into said chamber, said means being at said throats.

References Cited

UNITED STATES PATENTS

| | | | |
|---|---|---|---|
| 2,686,473 | 8/1964 | Vogel | 60—35.6 |
| 2,959,916 | 11/1960 | Carlton et al. | 60—35.6 |
| 3,093,348 | 6/1963 | Schelp et al. | 60—35.6 |
| 3,199,291 | 8/1965 | Kelley et al. | 60—35.6 |

SAMUEL FEINBERG, *Primary Examiner.*